(12) United States Patent
Olhagaray et al.

(10) Patent No.: US 12,109,740 B2
(45) Date of Patent: Oct. 8, 2024

(54) CURING MOLD FOR MANUFACTURING A TURBOMACHINE COMPONENT MADE OF COMPOSITE MATERIAL FROM A PREFORM AND METHOD FOR PRODUCING A COMPONENT BY MEANS OF SUCH A MOLD

(71) Applicant: SAFRAN, Paris (FR)

(72) Inventors: Jérôme Olhagaray, Moissy-Cramayel (FR); Thierry Patrick Chauvin, Moissy-Cramayel (FR); Michel Wlasow Wlasowski, Moissy-Cramayel (FR); Kris Hoes, Moissy-Cramayel (FR)

(73) Assignee: SAFRAN, Paris (FR)

( * ) Notice: Subject to any disclaimer, the term of this patent is extended or adjusted under 35 U.S.C. 154(b) by 553 days.

(21) Appl. No.: 17/413,247

(22) PCT Filed: Dec. 10, 2019

(86) PCT No.: PCT/FR2019/053001
§ 371 (c)(1),
(2) Date: Jun. 11, 2021

(87) PCT Pub. No.: WO2020/120895
PCT Pub. Date: Jun. 18, 2020

(65) Prior Publication Data
US 2022/0072742 A1 Mar. 10, 2022

(30) Foreign Application Priority Data
Dec. 14, 2018 (FR) ........................ 1872925

(51) Int. Cl.
*B29C 43/34* (2006.01)
*B29C 43/02* (2006.01)
(Continued)

(52) U.S. Cl.
CPC .............. *B29C 43/34* (2013.01); *B29C 43/02* (2013.01); *B29C 43/52* (2013.01); *B29C 70/44* (2013.01);
(Continued)

(58) Field of Classification Search
CPC ................ B29C 70/548; B29C 45/021; B29C 2043/3444; B29C 2045/2709
See application file for complete search history.

(56) References Cited

FOREIGN PATENT DOCUMENTS

| DE | 102016211255 A1 | 12/2017 |
|---|---|---|
| FR | 3059266 A1 | 6/2018 |
| WO | 2018146428 A1 | 8/2018 |

OTHER PUBLICATIONS

Search Report issued in French Patent Application No. 1872925 dated Oct. 21, 2019.
(Continued)

*Primary Examiner* — Christopher T Schatz
(74) *Attorney, Agent, or Firm* — Pearne & Gordon LLP (57) ABSTRACT

A curing mold for manufacturing a turbomachine component is made of composite material from a preform, including: a first and a second body defining an air gap receiving the preform; at least one primary channel arranged in the first and/or the second body; an injection member of a pressurized fluid in the primary channels; at least one secondary channel, in which a piston slides, which delimits, on the one hand, a first chamber in communication with the or a primary channel and, on the other hand, a second chamber in communication with the air gap, and which is designed to compress thermosetting resin which has entered the second chamber from the preform in the air gap, so as to put the preform under hydrostatic pressure.

4 Claims, 4 Drawing Sheets

(51) Int. Cl.
  *B29C 43/52* (2006.01)
  *B29C 70/44* (2006.01)
  *B29C 70/54* (2006.01)
  B29C 43/32 (2006.01)
  B29C 43/36 (2006.01)
  B29L 31/00 (2006.01)

(52) U.S. Cl.
  CPC .... *B29C 70/548* (2013.01); *B29C 2043/3233* (2013.01); *B29C 2043/3238* (2013.01); *B29C 2043/3444* (2013.01); *B29C 2043/3613* (2013.01); *B29L 2031/7504* (2013.01)

(56) References Cited

OTHER PUBLICATIONS

International Search Report issued in Application No. PCT/FR2019/053001 dated Mar. 24, 2020.
Written Opinion for PCT/FR2019/053001 dated Mar. 24, 2020.

CURING MOLD FOR MANUFACTURING A TURBOMACHINE COMPONENT MADE OF COMPOSITE MATERIAL FROM A PREFORM AND METHOD FOR PRODUCING A COMPONENT BY MEANS OF SUCH A MOLD

This is the National Stage of PCT international application PCT/FR2019/053001, filed on Dec. 10, 2019 entitled "CURING MOLD FOR MANUFACTURING A TURBOMACHINE COMPONENT MADE OF COMPOSITE MATERIAL FROM A PREFORM AND METHOD FOR PRODUCING A COMPONENT BY MEANS OF SUCH A MOLD", which claims the priority of French Patent Application No. 1872925 filed Dec. 14, 2018, both of which are incorporated herein by reference in their entirety.

TECHNICAL DOMAIN

The invention relates to a curing mold for manufacturing a turbomachine component made of a composite material from a preform, and a method for manufacturing a turbomachine component made of a composite material by means of such a mold.

STATE OF PRIOR ART

There are several known methods for manufacturing turbomachine components made of a composite material.

For example, it is known that a preform of the turbomachine component can be made by laying up from prepregs, then curing this preform to obtain the turbomachine component.

In this description, "prepreg" means a semi-finished product comprising reinforcing fibers and a thermosetting resin (matrix) in which the reinforcing fibers are impregnated. Such prepregs are usually packaged in the form of rolls of fiber mats, single-directional and continuous, impregnated with the thermosetting resin.

For example, prepregs are laid up by automated placement of fibers, also known as "AFP" for "Automated Fiber Placement", which is a laying up technique particularly suited for turbomachine components with complex geometry, especially with double curvature.

To achieve this, a robotic fiber placement head cuts strips from a prepreg mat, and then places these strips on the surface of a curing mold with a shape complementary to a surface of the turbomachine component to be manufactured. Several prepreg strips can be stacked on top of each other, in particular with different orientations of reinforcing fibers, but the reinforcing fibers remain perpendicular to the stacking direction of the prepregs.

The preform thus made is then positioned on the surface of a curing mold with a shape complementary to a surface of the turbomachine component to be manufactured, it is then covered with a membrane and placed in an autoclave in which the membrane is placed under a vacuum. In the autoclave, the preform is cured under controlled temperature and pressure conditions, so as to polymerize the resin and therefore consolidate the preform, and thus obtain the turbomachine component.

It is generally recognized that, due to controlled temperature and pressure conditions, curing the preform in an autoclave can be used to obtain turbomachine components made of a composite material with high mechanical performances.

However, when the turbomachine component to be manufactured has tight tolerance ranges for the geometry, as is the case for example with the external casings of the low-pressure compressor for a twin-spool turbomachine, the preform cannot be cured in an autoclave, since the membrane under a vacuum and the pressure inside the autoclave make it impossible to respect such tolerance ranges for the geometry of the turbomachine component to be manufactured.

Alternatively, after the prepregs have been laid up, the preform can for example be molded by transferring the same qualified resin. This molding technique is known as "SQRTM" for "Same Qualified Resin Transfer Molding".

This molding technique uses a curing mold comprising a first and a second body, the internal surfaces of which together define a fixed air gap with a shape complementary to the turbomachine component to be manufactured, a component to create a vacuum in the air gap, and a piston to inject resin in channels that are formed in the first and second bodies and that communicate with the air gap.

When the preform is being molded, the preform is placed in the air gap of the curing mold between the first and second bodies, so that empty spaces are left in the air gap along the free edges of the preform with which the channels communicate. The first and second bodies are then clamped against each other, for example by means of a press, and a vacuum is then created in the air gap. The curing mold is heated, for example by means of the press, while resin, identical to the resin in prepregs forming the preform, is injected into the channels so as to fill the empty spaces in the air gap along the free edges of the preform with resin, and thus put the preform under hydrostatic pressure in the air gap. This hydrostatic pressure is maintained during curing of the preform, which is thus made under controlled temperature and pressure conditions.

SQRTM can thus be used not only to obtain turbomachine parts with high mechanical performance due to curing of the preform under controlled temperature and pressure conditions, but also to maintain tight tolerance ranges for their geometry due to the curing mold with a fixed air gap. The use of resin identical to the resin used for the prepregs forming the preform also makes it possible to use SQRTM in the aeronautics field, without the need to obtain a new qualification for the resin.

However, SQRTM has the disadvantage that additional resin is required to apply hydrostatic pressure to the preform in the air gap, without this additional resin being retained after the turbomachine component has been manufactured, since the edge of the preform is removed after stripping of the mold. Therefore there is a loss of consumables, generating a significant additional cost for manufacturing of turbomachine parts.

PRESENTATION OF THE INVENTION

The purpose of this invention is to overcome the disadvantages mentioned above, in particular by disclosing a curing mold for manufacturing a turbomachine component made of composite material, from a preform made by laying up prepregs, comprising an air gap in which the preform fits and one or several pistons designed to compress the resin of the preform that is inserted in a chamber of the piston(s) from the air gap, and thus apply hydrostatic pressure to the preform.

More specifically, the subject of the invention is a curing mold for manufacturing a turbomachine component from a composite material, starting from a preform made by laying up prepregs comprising reinforcing fibers impregnated in a thermosetting resin, the curing mold comprising:

- a first body and a second body designed to be fitted together, the first and second bodies each comprising an internal surface itself comprising a peripheral area at which the first and second bodies are in contact with each other and a central area defining a fixed air gap between the first and second bodies, the shape of the air gap being complementary to the turbomachine component to be manufactured and intended to accommodate the preform:
- a heating member designed to heat the preform in the air gap to a first temperature, so as to reduce the viscosity of the resin;
- at least one primary channel formed in the first and/or second body;
- an injection member designed to inject fluid under pressure into the primary channel(s);
- at least one secondary channel formed in the first and/or second body, the or each secondary channel receiving a piston installed free to slide inside said secondary channel along a sliding axis and delimiting, on the one hand, a first chamber in communication with the or a primary channel(s), and on the other hand, a second chamber in communication with the air gap, the piston of the or each secondary channel being also designed to compress resin that entered the second chamber of said secondary channel from the preform into the air gap, so as to put the preform under hydrostatic pressure when the preform is located in the air gap, when the heating member heats the preform to the first temperature and when the injection member injects fluid under pressure into the primary channel(s) to the first chamber of said secondary channel.

According to variant embodiments that can be taken together or separately:

- the heating member is designed to heat the preform to a second temperature, higher than the first temperature, so as to cure the preform, when said preform is located in the air gap;
- the piston of the or each of the secondary channels is designed to maintain the compression applied on the resin in the second chamber of said secondary channel, when the preform is located in the air gap, when the heating member heats the preform to the second temperature and when the injection member injects fluid under pressure into the primary channel(s) as far as the first chamber of said secondary channel;
- the second chamber of the or each secondary channel communicates with the air gap through a nozzle with a cross-section perpendicular to the sliding axis of the piston of said secondary channel, smaller than that of said second chamber;
- the reinforcing fibers of the preform are oriented perpendicular to a stacking direction;
- the sliding axis of the piston of the or each secondary channel is coincident with the stacking direction of a portion of the preform facing said secondary channel.

Another purpose of the invention is a method of manufacturing a turbomachine component made of composite material, making use of the curing mold as described above, starting from a preform made by laying up prepregs comprising reinforcing fibers impregnated in a thermosetting resin, the method comprising the following steps:

- place the preform in the air gap, between the first and second bodies of the curing mold;
- heat the preform to the first temperature, with resin from the preform entering the second chamber of the secondary channel(s);
- inject fluid under pressure into the or each primary channel as far as the first chamber of the or each secondary channel, so that the piston of the or each secondary channel compresses the resin that enters the second chamber of said secondary channel from the preform into the air gap, the preform being kept at the first temperature.

According to variant embodiments that can be taken together or separately:

- a hydrostatic pressure between 3 and 10 bar inclusive, particularly between 3 and 7 bar inclusive, is applied to the preform during the step to inject fluid under pressure into the or each primary channel;
- the method comprises a subsequent step to heat the preform to the second temperature, so as to cure the preform, the compression applied by the or each piston in the secondary channel(s) on the resin in the second chamber of said secondary channel being maintained, the resin cured in the or each second chamber forming sprue;
- the method includes a subsequent step to demould the preform thus cured, the sprue of cured resin in the second chamber of the secondary channel(s) being broken, so as to obtain the turbomachine component.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED DESCRIPTION

Figure 1:
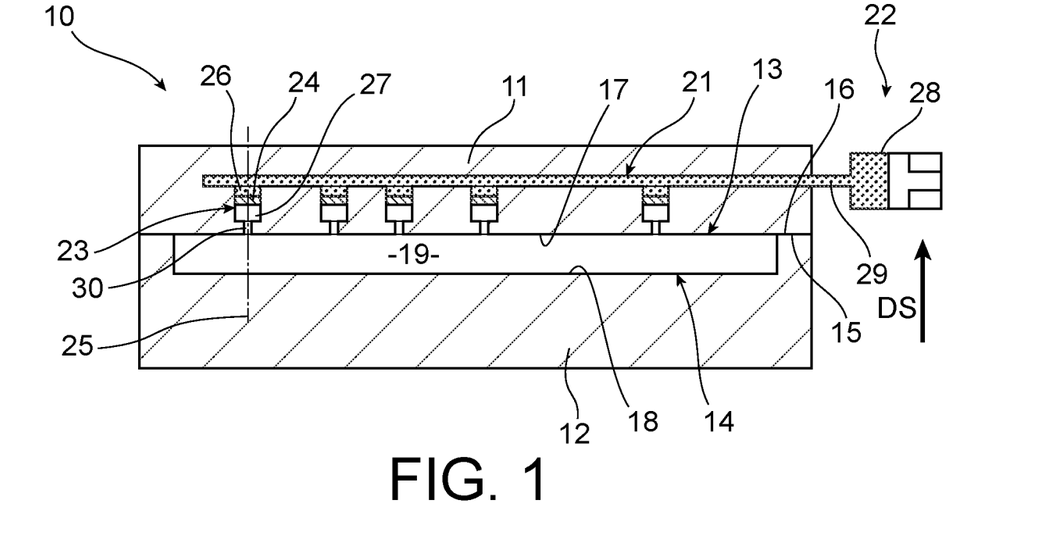
FIG. 1 is a diagrammatic sectional view of a curing mold to manufacture a turbomachine component made of a composite material, from a preform, according to one embodiment of the invention, the curing mold being represented without the preform.
Figure 2:
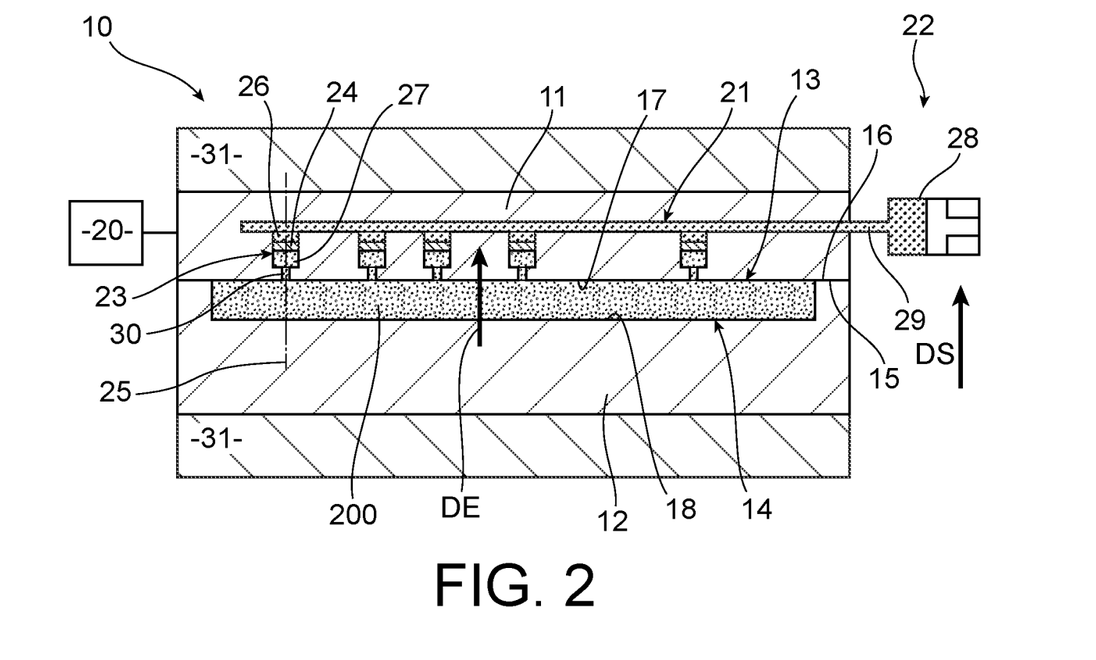
FIG. 2 is a sectional view of the curing mold illustrated in FIG. 1, the preform being located inside the curing mold.

FIGS. 1 and 2 show a curing mold 10 to manufacture a turbomachine component made of a composite material, from a preform 200, according to one embodiment of the invention.

The preform 200 is made by laying up prepregs comprising reinforcing fibers impregnated in a thermosetting resin. The preform 200 comprises a surplus of resin relative to the quantity of thermosetting resin in the turbomachine component to be manufactured.

For example, the preform 200 is made by laying up prepregs comprising single-directional carbon fibers impregnated with an epoxy thermosetting resin. These prepregs may for example comprise 34% by mass of epoxy thermosetting resin. In the remainder of the description, the values provided are adapted in particular to a preform 200 made by laying up such prepregs.

For example, the preform 200 is produced by automated placement of fibers, also known as "AFP", which stands for "Automated Fiber Placement". As a variant, the preform 200 can be made by manual or automated laying up by placement of tape, also known as "ATL", which stands for "Automated Tape Laying". These laying up techniques are well known to a person skilled in the art.

Reinforcing fibers for the preform 200 are oriented perpendicular to a stacking direction DE that defines a thickness of the preform 200. The reinforcing fibers are thus stacked along the stacking direction DE. It will be understood that, depending on the geometry of the preform 200, particularly its curvature(s), the stacking direction DE of the reinforcing fibers of the preform 200 may have an orientation that varies from one area of the preform 200 to another.

For example, in the example shown in FIGS. 1 and 2, the preform 200 is in the form of a rectangular plate. As a variant (not shown), the preform 200 is in the form of a shell.

The curing mold 10 comprises a first body 11 and a second body 12 designed to be fitted together. Each of the first and second bodies 11, 12 has an internal surface 13, 14 itself comprising a peripheral area 15, 16 in which the first and second bodies 11, 12 are in contact with each other in a clamping direction DS, for example vertical, and a central area 17, 18. The central areas 17, 18 of the internal surface 13, 14 of the first and second bodies 11, 12 define or jointly delimit a fixed air gap 19 that has a shape complementary to the turbomachine part to be manufactured and that will accommodate the preform 200 (FIG. 1).

The curing mold 10 also comprises a heating member 20 designed to heat the preform 200 in the air gap 19 to a first temperature, so as to reduce the viscosity of the resin (FIG. 2). For example, this makes it possible for the resin of the preform 200 to be distributed uniformly in the air gap 19 of the curing mold 10.

For example, the first temperature is between 80 and 110° C. inclusive. For example, the first temperature is held for a duration between 30 and 60 minutes inclusive. This time corresponds particularly to a temperature homogenization plateau of the curing mold 10.

The curing mold 10 also includes at least one primary channel 21 formed in the first and/or second body 11, 12, an injection member 22 designed to inject fluid under pressure into the or each primary channel 21, and at least one secondary channel 23 formed in the first and/or second body 11, 12.

The or each secondary channel 23 accommodates a piston 24 installed free to slide inside said secondary channel 23 along a sliding axis 25 and delimiting, on one hand, a first chamber 26 in communication with the or with one of the primary channels 21, and on the other hand, a second chamber 27 in communication with the air gap 19.

The piston 24 of the or each secondary channel 23 is also designed to compress the resin that enters the second chamber 27 of said secondary channel 23 from the preform 200 into the air gap 19, so as to apply hydrostatic pressure to the preform 200 when the preform 200 is located in the air gap 19, when the heating member 20 heats the preform 200 to the first temperature and when the injection member 22 injects fluid under pressure into the primary channel(s) 21 as far as the first chamber 26 of said secondary channel 23. For example, a hydrostatic pressure of between 3 and 10 bar inclusive, preferably between 3 and 7 bar inclusive, is applied to the preform 200.

"Fluid under pressure" means that the fluid injected into the first chamber 26 of the secondary channel(s) 23, via the primary channel(s) 21, is at such a pressure that the piston 24 of said secondary channel 23 compresses the resin of the second chamber 27 of said secondary channel 23.

Thus, the curing mold 10 uses surplus resin in the preform 200 in excess of the amount of resin in the turbomachine component to be manufactured to apply hydrostatic pressure to the preform 200. Since this surplus resin is intended to be used in any case during manufacture of the preform 200, there is no loss of resin beyond what is already contained in the preform 200. The curing mold 10 thus avoids a significant additional cost that would be related to an additional supply of resin to apply hydrostatic pressure to the preform 200.

For example, the heating member 20 is also designed to heat the preform 200 to a second temperature, higher than the first temperature, so as to cure the preform 200, when said preform 200 is located in the air gap 19. Curing the preform 200 polymerizes the resin in the preform 200 and therefore consolidates it so as to obtain the turbomachine component. The second temperature corresponds in particular to a polymerization temperature of the resin of the preform 200. For example, the second temperature is between 170 and 190° C. inclusive, and particularly equal to 180° C. For example, the second temperature is held for a period equal to 2h.

The piston 24 of each of the secondary channels 23 can then be designed to maintain the compression applied on the resin in the second chamber 27 of said secondary channel 23, when the preform 200 is located in the air gap 19, when the heating member 22 heats the preform 200 to the second temperature and when the injection member 22 injects fluid under pressure into the primary channel(s) 21 as far as the first chamber 26 of said secondary channel 23. The preform 200 is thus cured under controlled temperature and pressure conditions, so that a turbomachine component with high mechanical performances can be obtained. The compression applied on the resin in the second chamber 27 of the secondary channel 23 by the or each piston 24 is, for example, held during curing. As a variant, it is modified for and/or during curing.

For example, the heating member 20 is designed to heat the preform 200 through the first and second bodies 11, 12 of the curing mold 10, when the preform 200 fits into the air gap 19 (FIG. 2). For example, the heating member 22 comprises a press like that described below, a heating system using a heat transporting fluid such as oil, or one or more heating cartridges integrated into the first and second bodies 11, 12.

The fluid injected into the or each primary channel 21 comprises, for example, air, oil, etc.

The injection member 22 comprises, for example, a compressor 28 designed to apply pressure to the fluid to be injected into the primary channel(s) 21 and an injection conduit 29 in communication, on one hand, with the compressor 28 and, on the other hand, with the primary channel(s) 21.

The second chamber 27 of the or each secondary channel 23 communicates for example with the air gap 19 through a nozzle 30 with a cross-section perpendicular to the sliding axis 25, smaller than that of said second chamber 27. In this way, after the preform 200 has been cured, the resin cured in the second chamber 27 of the or each secondary channel 23 forms a sprue that breaks easily when demoulding.

The sliding axis 25 of the piston 24 of the or each secondary channel 23 is, for example, coincident with the stacking direction DE of a portion of the preform 200 facing said secondary channel 23.

The curing mold 10 may also comprise a press 31 designed to compress the first and second bodies 11, 12 against each other along the clamping direction DS, when the first and second bodies 11, 12 are fitted together (FIG. 2). The press 31 thus clamps the first and second bodies 11, 12 of the curing mold 10 against each other, and resists expansion of the preform 200. The press 30 also assures contact between the peripheral areas 15, 16 of the internal surfaces 13, 14 of the first and second bodies 11, 12 of the curing mold 10 and thus prevents resin leaks.

Figure 3:
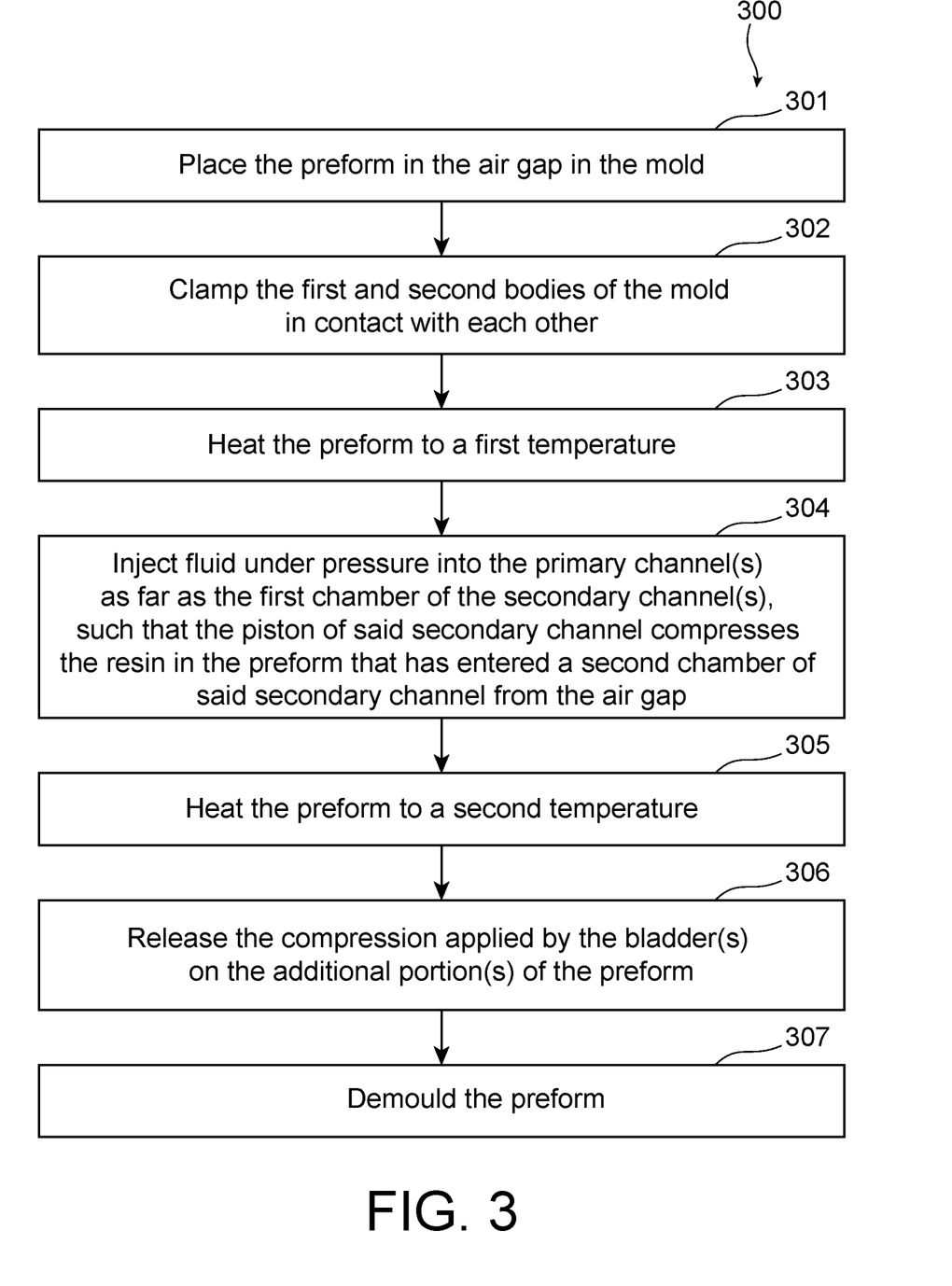
FIG. 3 is a flow chart of a method of manufacturing a turbomachine component made of composite material using the curing mold illustrated in FIGS. 1 and 2.

FIG. 3 illustrates a method 300 of manufacturing a turbomachine component made of a composite material using the curing mold 10. The manufacturing method 300 includes the following steps:

place 301 the preform 200 in the air gap 19, between the first and second bodies 11, 12 of the curing mold 10;

if applicable, clamp 302 the first and second bodies 11, 12 of the curing mold 10 together along the clamping direction DS;

heat 303 the preform 200 to the first temperature, with resin from the preform 200 entering the second chamber 27 of the secondary channel(s) 23;

inject 304 fluid under pressure into the or each primary channel 21 as far as the first chamber 26 of the or each secondary channel 23, so that the piston 24 of the or each secondary channel 23 compresses the resin that entered the second chamber 27 of said secondary channel 23 from the preform 200 into the air gap 19, the preform 200 being kept at the first temperature. Hydrostatic pressure is thus applied to the preform 200. This hydrostatic pressure may for example be between 3 and 10 bar inclusive, preferably between 3 and 7 bar inclusive.

The manufacturing method 300 may also include the following steps:

heat 305 the preform 200 to the second temperature, so as to cure the preform 200, the compression applied by the or each piston 24 in the secondary channel(s) 23 on the resin that entered the second chamber 27 of said secondary channel 23 being maintained, the resin cured in the or each second chamber 27 of said secondary channel 23 forming sprue;

if applicable, release 306 the compression applied by the or each piston 24 in the or each secondary channel 23 on the resin that entered into the second chamber 27 of said secondary channel 23;

unmould 307 the preform 200 thus cured, the sprue of cured resin in the second chamber 27 of the secondary channel(s) 23 being broken, so as to obtain the turbomachine component.

For example, the step to release 306 occurs as soon as the resin in the preform 200 solidifies in the curing mold 10.

For example, a finishing step is included to remove resin sprue remaining on the cured preform 200, particularly to smooth areas in which the resin sprue broke during demoulding 307.

Figure 4:
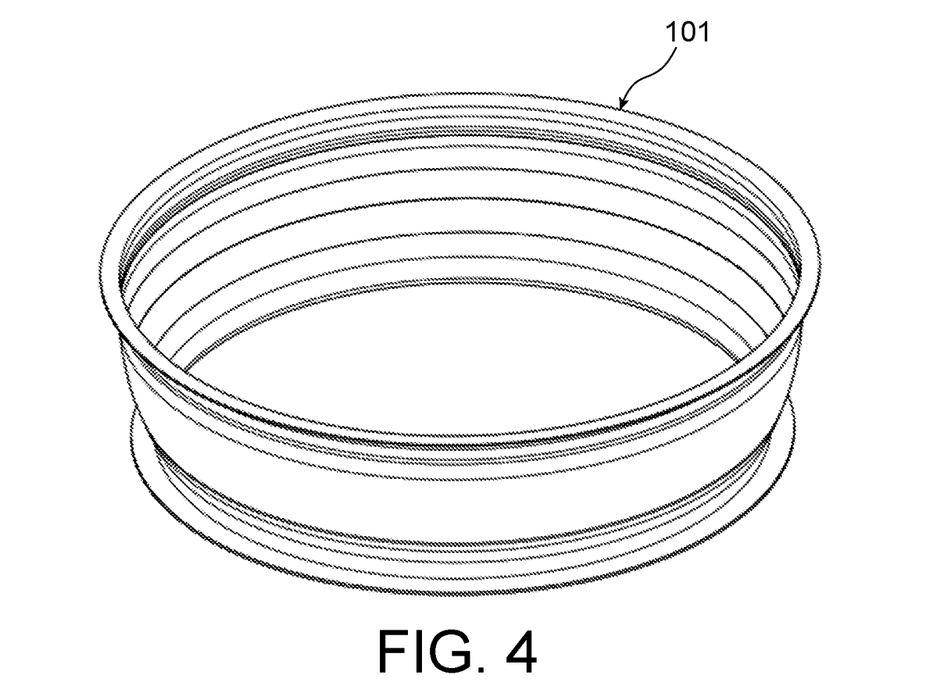
FIG. 4 is a perspective view of an example of a turbomachine component obtained using the manufacturing method illustrated in FIG. 3.
Figure 5:
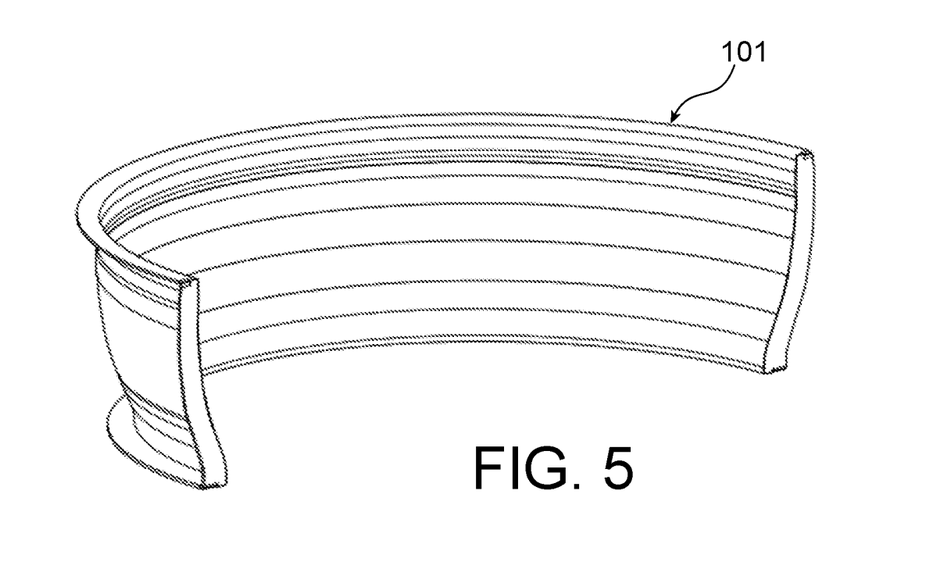
FIG. 5 is a perspective view of another example of a turbomachine component obtained using the manufacturing method illustrated in FIG. 3.
Figure 6:
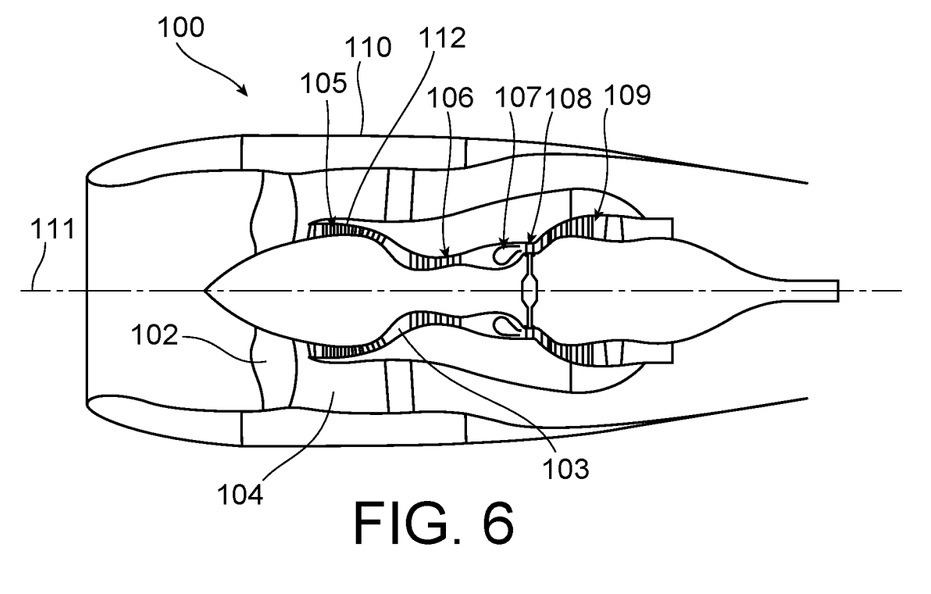
FIG. 6 is a longitudinal, diagrammatic sectional view of a turbomachine for an aircraft comprising the turbomachine component illustrated in FIG. 4.

FIGS. 4 and 5 each show an example of a turbomachine component 101 made of composite material obtained by use of manufacturing method 300. FIG. 6 shows a turbomachine 100 for an aircraft comprising the turbomachine component 101.

The turbomachine 100 is a twin spool turbomachine. It comprises a fan 102 for suction of an air stream that is divided downstream from the fan 102 into a core flow circulating in a core flow channel called the core flow stream 103, inside a core of the turbomachine 100, and a bypass flow going around this core in a bypass flow channel, called the bypass flow stream 104.

The core of the turbomachine 100 comprises, in order along the air flow direction from upstream to downstream, a low pressure compressor 105 also called a booster, a high pressure compressor 106, a combustion chamber 107, a high pressure turbine 108 and a low pressure turbine 109.

The rotors of the high-pressure compressor 106 and the high-pressure turbine 108 are connected by a shaft called the "high-pressure shaft", while the rotors of the low pressure compressor 105 and the low pressure turbine 109 are connected by a shaft called the "low pressure shaft" surrounded by the high pressure shaft.

The turbomachine 100 is clad by a nacelle 110 surrounding the bypass flow stream 104.

In addition, the rotors of the turbomachine 100 are mounted rotating around a longitudinal direction 111 of the turbomachine 100.

The low-pressure compressor 105 comprises one or more stators in addition to one or more rotors, arranged alternately with the rotors along the longitudinal direction 111.

The stators include blades extending radially from a longitudinal direction 111 between an inner shell and an outer shell (not shown) on which said blades are carried by an outer casing 112.

For example, the turbomachine component 101 forms the outer casing 112 of the low-pressure compressor 105 (FIG. 4). The turbomachine component 101 can also form a sector of the outer casing 112 of the low-pressure compressor 105 (FIG. 5).

"Sector" means an angular sector of the outer casing around the longitudinal direction 111. Alternatively (not shown), the turbomachine component 101 forms a rotor drum.

What is claimed is:

1. A curing mold for manufacturing a turbomachine component from a composite material, starting from a preform made by laying up prepregs comprising reinforcing fibers impregnated with a thermosetting resin, the curing mold comprising:

a first body and a second body configured to be fitted together, the first and second bodies each comprising an internal surface, each said internal surface comprising a peripheral area at which the first and second bodies are in contact with each other and a central area defining a fixed air gap between the first and second bodies, a shape of the air gap being complementary to the turbomachine component to be manufactured and intended to accommodate the preform;

a heating member configured to heat the preform in the air gap to a first temperature, so as to reduce the viscosity of the resin;

a primary channel formed in the first and/or second body;

an injection member configured to inject fluid under pressure into the primary channel; and a secondary channel formed in the first and/or second body, the secondary channel having a piston installed free to slide inside said secondary channel along a sliding axis and delimiting, on the one hand, a first chamber in communication with the primary channel, and on the other hand, a second chamber in communication with the air gap, the piston being also configured to compress resin that entered the second chamber of said secondary channel from the preform into the air gap, so as to put the preform under hydrostatic pressure when the preform is located in the air gap, when the heating member heats the preform to the first temperature and when the injection member injects fluid under pressure into the primary channel to the first chamber of said secondary channel.

2. The curing mold according to claim 1, wherein:
the heating member is also configured to heat the preform to a second temperature, higher than the first temperature, so as to cure the preform, when said preform is located in the air gap;
the piston is configured to maintain the compression applied on the resin in the second chamber of said secondary channel, when the preform is located in the air gap, when the heating member heats the preform to the second temperature and when the injection member injects fluid under pressure into the primary channel as far as the first chamber of said secondary channel.

3. The curing mold according to claim 1, wherein the second chamber of the secondary channel communicates with the air gap through a nozzle with a cross-section perpendicular to the sliding axis of the piston of said secondary channel, smaller than that of said second chamber.

4. The curing mold according to claim 1, wherein:
the reinforcing fibers of the preform are oriented perpendicular to a stacking direction;
the sliding axis of the piston of the secondary channel is coincident with the stacking direction of a portion of the preform facing said secondary channel.

\* \* \* \* \*